(12) United States Patent
Mleczko et al.

(10) Patent No.: US 10,189,004 B2
(45) Date of Patent: Jan. 29, 2019

(54) REACTION CHAMBER FOR A CHEMICAL REACTOR, AND CHEMICAL REACTOR CONSTRUCTED THEREFROM

(71) Applicant: BAYER AKTIENGESELISCHAFT, Leverkusen (DE)

(72) Inventors: Leslaw Mleczko, Dormagen (DE); Sigurd Buchholz, Cologne (DE); Karl-Robert Boos, Burscheid (DE); Sebastian Falss, Cologne (DE)

(73) Assignee: BAYER AKTIENGESELLSCHAFT, Leverkusen (DE)

( * ) Notice: Subject to any disclaimer, the term of this patent is extended or adjusted under 35 U.S.C. 154(b) by 0 days.

(21) Appl. No.: 15/318,924

(22) PCT Filed: Jun. 15, 2015

(86) PCT No.: PCT/EP2015/063266
§ 371 (c)(1),
(2) Date: Dec. 14, 2016

(87) PCT Pub. No.: WO2015/193214
PCT Pub. Date: Dec. 23, 2015

(65) Prior Publication Data
US 2017/0136440 A1 May 18, 2017

(30) Foreign Application Priority Data

Jun. 16, 2014 (DE) .................. 10 2014 108 407

(51) Int. Cl.
*B01J 19/18* (2006.01)
*B01J 19/00* (2006.01)
*B01J 19/20* (2006.01)

(52) U.S. Cl.
CPC ....... *B01J 19/1818* (2013.01); *B01J 19/0066* (2013.01); *B01J 19/1862* (2013.01);
(Continued)

(58) Field of Classification Search
CPC ................................................ B01J 19/1818
See application file for complete search history.

(56) References Cited

U.S. PATENT DOCUMENTS

| 3,583,682 A | 6/1971 | Berents |
| 4,007,016 A | 2/1977 | Weber et al. |
| 4,370,470 A | 1/1983 | Vidaurri et al. |
| 9,059,223 B2 * | 6/2015 | Weiner .............. H01L 21/67028 |
| 2012/0208122 A1 | 8/2012 | Faucher et al. |

FOREIGN PATENT DOCUMENTS

| CH | 502839 A | 2/1971 |
| DE | 3213628 A1 | 12/1982 |
| DE | 102004003925 A1 | 8/2005 |
| EP | 1904225 B1 | 2/2012 |
| WO | 2006126891 A1 | 5/2005 |

OTHER PUBLICATIONS

Couper, J. R., Chemical process equipment: Selection and design, (2005), 2nd ed., Elsevier, Amsterdam, Boston, pp. 307-315.
(Continued)

*Primary Examiner* — Stuart L Hendrickson
(74) *Attorney, Agent, or Firm* — McBee Moore Woodward & Vanik IP, LLC

(57) ABSTRACT

A reaction chamber for a chemical reactor comprises a casing (100) of the reaction chamber, a floor (200) of the reaction chamber having an opening (300) located in the floor, an agitator shaft (400) located in the chamber and having at least one agitator element (500), connected thereto, wherein the agitator shaft (400), seen in the longitudinal direction, has a beginning (600) and an end (700). In the opening (300) of the floor (200) a removable sleeve (800) is provided, which projects out of the reaction chamber. The sleeve (800) is arranged in alignment with the axis of rotation of the agitator shaft (400). The internal diameter of the sleeve (800) is greater than the diameter of the agitator shaft (400) and the agitator shaft (400), at the beginning (Continued)

Figure 1:
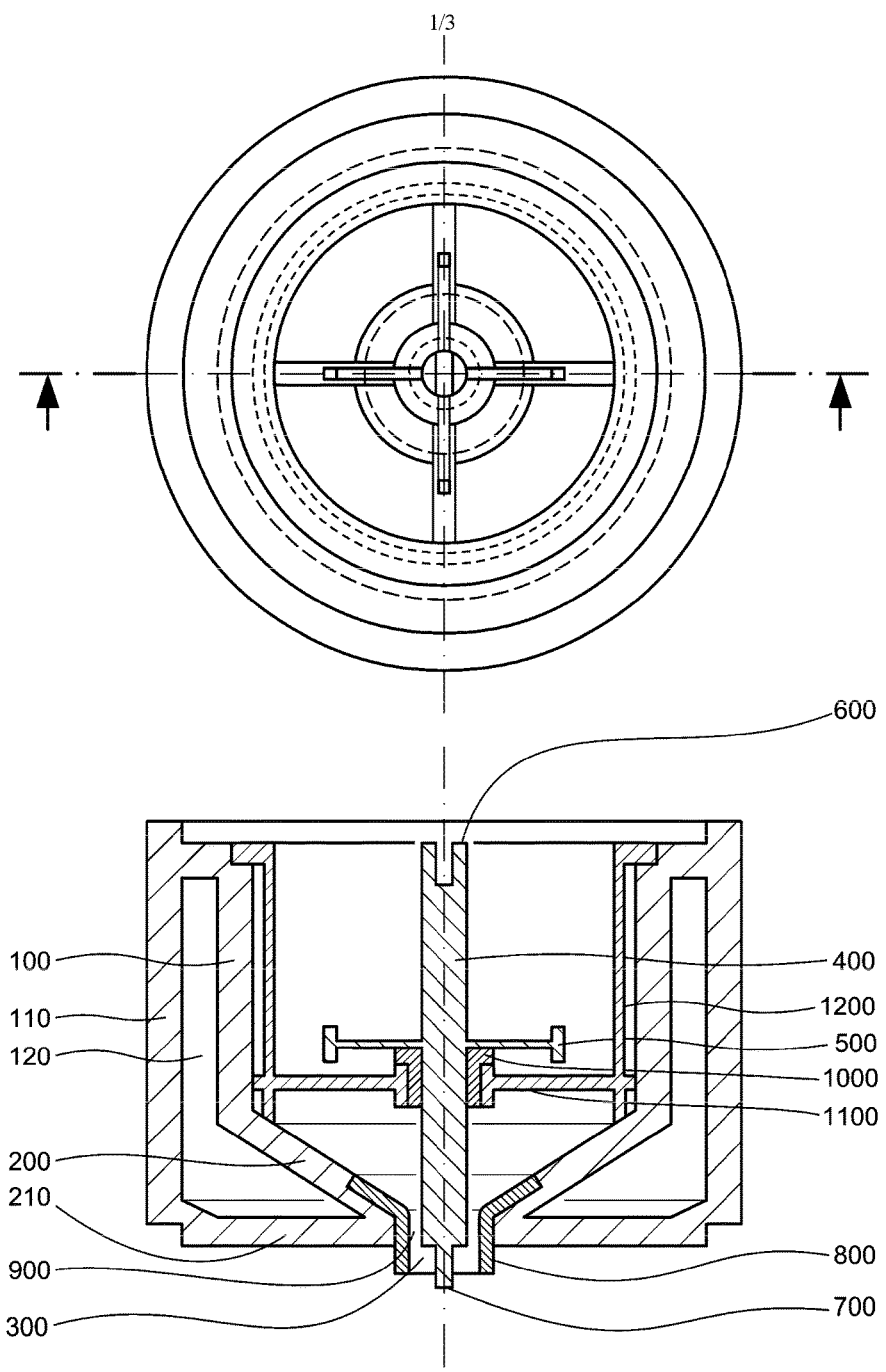

(600) thereof and/or at the end (700) thereof, is adapted to absorb reversibly a torque provided by means of a further shaft and/or to transmit a torque to a further shaft. Using such a reaction chamber, it is possible to build up modular chemical reactors having decreased backmixing.

19 Claims, 3 Drawing Sheets

(52) U.S. Cl.
CPC ........ *B01J 19/20* (2013.01); *B01J 2219/0002* (2013.01); *B01J 2219/0004* (2013.01); *B01J 2219/00033* (2013.01); *B01J 2219/00094* (2013.01); *B01J 2219/00166* (2013.01); *B01J 2219/00247* (2013.01); *B01J 2219/185* (2013.01); *B01J 2219/1943* (2013.01); *B01J 2219/1946* (2013.01)

(56) References Cited

OTHER PUBLICATIONS

Xu, et al., "Interstage Backmixing for Single-Phase Systems in Compartmented, Agitated Columns: Design Correlations," Ind. Eng. Chem. Res. (2005), vol. 44: 6103-6109.

Zhang, et al., "Residence Time Distribution in a Multistage Agitated Contactor with Newtonian Fluids: CFD Prediction and Experimental Validation," Ind. Eng. Chem. Res. (2007), vol. 46: 3538-3546.

International Search Report of PCT/EP2015/063266 dated Oct. 13, 2015.

* cited by examiner

REACTION CHAMBER FOR A CHEMICAL REACTOR, AND CHEMICAL REACTOR CONSTRUCTED THEREFROM

CROSS REFERENCE TO RELATED APPLICATIONS

This application is a § 371 National State Application of PCT/EP2015/063266, filed Jun. 15, 2015, which claims priority to European Application No. 10 2014 108 407.1 filed Jun. 16, 2014.

BACKGROUND OF THE INVENTION

Field of the Invention

The work which led to this invention was funded in accordance with the grant agreement No. 246461 in the course of the seventh framework program of the European Union (FP7/2007-2013).

Description of Related Art

The present invention relates to a reaction chamber for a chemical reactor, comprising a casing of the reaction chamber, a floor of the reaction chamber having an opening located in the floor and an agitator shaft located in the chamber and having at least one agitator element, connected thereto. The invention further relates to a chemical reactor which comprises a multiplicity of reaction chambers according to the invention, and also a process for carrying out chemical reactions in such a reactor.

For many chemical apparatuses, it is advantageous to combine a good mixing with a narrow residence time distribution in a continuous mode of operation. Advantages of the good mixing are, for example, the reduction of mass transfer resistances, a more rapid homogenization or the suspension of solids.

A narrow residence time distribution frequently permits a higher product quality and a higher space-time yield. The advantages of a continuous mode of operation include, inter alia, stabilization of product quality, higher resource efficiency, shorter set-up times, a higher degree of automation and lower hold-up volumes.

Possible applications to which said requirement profile can apply are continuous processing of single- or multiphase liquids, dispersions, gas-liquid mixtures, supercritical fluids or mixtures of said materials in various process engineering apparatuses such as chemical or biological reactors, and also apparatuses for absorption, extraction or crystallization.

In many chemical processes, in addition, the achievable heat exchange is a parameter to be taken into account. Microstructured apparatuses here offer the possibility of achieving very high specific heat exchange surface areas. On account of the low volume thereof, however, they are not suitable for reactions having a long residence time if a certain throughput is to be achieved. In addition, the risk of fouling and blocking due to solids present in the process on account of the small channel diameter is a great challenge.

Since solids, e.g. in the form of a heterogeneous catalyst, or insoluble reaction products, are present in many process engineering processes as wanted or unwanted components, the handling of suspended solids can be an additional requirement of the process equipment.

In practice, the defined requirement profile can most easily be achieved by a cascade of series-connected, continuously operated stirred tanks. Under certain conditions, however, a more compact structure of the apparatus may be necessary. Such an application case is, e.g., installation into compact, modular production plants.

It is further known that the defined requirement profile can also be met in particular applications by subdividing a flow tube into a plurality of compartments, each of which are mixed by suitable agitators and are connected to one another via openings.

However, the performance ability of such an apparatus depends greatly on the operating conditions. A high agitator rotary speed, long residence times and large openings between the individual compartments lead to a higher degree of back-mixing and therefore to a wider residence time distribution (e.g. L. Zhang, Q. Pan, G. L. Rempel, Residence Time Distribution in a Multistage Agitated Contactor with Newtonian Fluids: CFD Prediction and Experimental Validation: Industrial & Engineering Chemistry Research, Ind. Eng. Chem. Res. 46 2007, 3538-3546.).

Such apparatuses are widely used, especially in extraction technology. In theory, the back mixing can be minimized by using very small openings between adjoining compartments. However, in this case the pressure drop in the apparatus increases and the discharge of solids is no longer possible, and so this measure is frequently unsuitable for practical use.

The use of a cascaded tube in the reaction technique is described, for example, in U.S. Pat. No. 4,370,470 (DE 32 13 628 A1). The subject matter is a contact device which is a vertical long cylindrical housing having closed ends that is subdivided into a plurality of individual chambers by horizontal baffle plates and having access from one chamber to another via concentric circular openings that are axially centered in the baffle walls, having a continuously rotatable shaft that extends concentrically to the baffle walls within the housing, having at least one agitator appliance that is fixed to the shaft in each chamber, wherein the shaft in the circular openings forms ring-shaped openings in the baffle walls, in such a manner that the ratio of the back-flow extent to the feed extent through the openings is less than 1.5. A description is also given of a process for the continuous preparation of arylene sulfide polymers, in which reaction components that are suitable for the preparation of poly (arylene sulfide) are fed into at least one first chamber of the above described contact vessel, as a result of which a reaction mixture is formed that is conducted through the chambers of the contact device, while each chamber is maintained under conditions for the formation of arylene sulfide polymers, and arylene sulfide polymer is obtained from a chamber that is situated remote from the chamber into which the starting reaction components are introduced. The achievable degree of backmixing in such apparatuses is frequently too high for applications that require a very narrow residence time distribution; in particular, if the reactor volume is low (some liters or less) and the implementable number of stages is therefore restricted.

WO 2006/126891 (EP 1 904 225) discloses, for example, a cylindrical reactor for the continuous treatment of a stirred material composition that comprises at least two components, comprising a number of reactor chambers that are arranged in a primarily vertical column, separated by base plates, while the transport of the material composition from any desired reactor chamber in the steady state is arranged in order to proceed to the adjoining chamber below, wherein each reactor chamber is provided with a vane mechanism. The vane mechanism comprises a ring-shaped member that is concentric to the reactor chamber and has a vertical elongation and at least one movable agitator member that is arranged in order to induce a vertical movement component in the material in the chamber. The transport is arranged from one chamber to the next chamber in order to take place periodically through an opening having a slider flap in the base plate of each chamber. However, such an apparatus has the disadvantage that an additional movable part and, in association therewith, a seal also, needs to be provided at each chamber.

Cascaded tube installations having elongated gaps for decreasing the backmixing are described in the following publications: J. R. Couper, Chemical process equipment: Selection and design, 2nd ed., Elsevier, Amsterdam, Boston, 2005, pp. 307-315 and B. C. Xu, W. R. Penney, J. B. Fasano, Interstage Backmixing for Single-Phase Systems in Compartmented, Agitated Columns: Design Correlations, Ind. Eng. Chem. Res. 44 (2005) 6103-6109.

For abrasive systems in particular, it is desirable to provide a more robust solution in terms of apparatus of the described formulation of the problem. In addition, it is desirable to make the apparatus design as flexible as possible in such a manner that use is possible with differing systems and under differing process conditions. In this case, the flexibility term comprises not only the property of changing the total volume of the reactor in a flexible manner, but also exchanging individual elements such as agitators or baffles to optimize the geometry for a particular application.

SUMMARY

The object of the present invention is to provide an apparatus which combines said requirements. Preferably, said apparatus in addition provides a specific heat-exchange surface area which is as high as possible.

According to the invention, this object is achieved by a reaction chamber for a chemical reactor, comprising a casing of the reaction chamber, a floor of the reaction chamber having an opening located in the floor, and an agitator shaft located in the chamber and having at least one agitator element, connected thereto, wherein the agitator shaft, seen in the longitudinal direction, has a beginning and an end. In addition in the opening of the floor a removable sleeve is provided, which projects out of the reaction chamber, the sleeve is arranged in alignment with the axis of rotation of the agitator shaft, the internal diameter of the sleeve is greater than the diameter of the agitator shaft and the agitator shaft, at the beginning thereof and/or at the end thereof, is adapted to absorb reversibly a torque provided by means of a further shaft and/or to transmit a torque to a further shaft.

DETAILED DESCRIPTION OF A PREFERRED EMBODIMENT

By means of a multiplicity of reaction chambers according to the invention, a chemical reactor can be built up in a modular manner and be flexibly adapted to changing requirements. The reaction chamber according to the invention can of course be used not only for chemical reactions in the narrow sense, but also for example for extractions and the like.

The "casing of the reaction chamber" is that part of the reactor chamber which, in the case of a vertical reaction chamber, is the lateral boundary of the chamber interior to the outside world. In the case of a cylindrical or cylinder-like reaction chamber, it is then the cylinder casing. Accordingly, the "floor of the reaction chamber" is the lower boundary, seen in the vertical direction, of the chamber interior to the outside world.

Following the concept of modular usability, in the reaction chamber there is already one agitator shaft having at least one agitator element, connected thereto, to agitate the contents of the reaction chamber. Both radially and tangentially demanding agitation elements can be used. The agitating elements can also be made to be detachable from the agitator shaft and therefore exchangeable.

Furthermore, additional internals can be present in the reaction chamber. These meet two main purposes. Firstly, they serve as baffles and prevent the co-rotation of the liquid in the apparatus and support an intensive mixing, secondly, they support an axial and radial bearing mounting of the agitator shaft. Owing to the modular structure, the rapid adaptation to various material systems is realizable. For example, in a system of relatively high viscosity, without great expenditure, the baffles can be adapted and anchor agitators can be used.

A fixed upper boundary of the chamber interior to the outside world, also understood as a "lid", is not absolutely necessary for the reaction chamber according to the invention. This is because a plurality of reaction chambers can be stacked one above the other (and are intended to be, in order to form the further chemical reactor according to the invention that is described hereinafter) and the floor of the one reaction chamber can act as a lid of the chamber lying therebeneath.

The floor of the reaction chamber according to the invention in addition has an opening. Through this opening, agitator shafts can be conducted out of the interior of the reaction chamber and in addition substances can be introduced into the chamber or discharged from the chamber. At the beginning and/or the end of the agitator shaft, said agitator shaft is designed to absorb or transmit a torque. Preferably it is a redetachable shape-fit connection. This can be implemented, for example, using a simple push-fit connection such as a hexagon. In this manner, in the case of reaction chambers according to the invention that are stacked one above the other, a shared agitator shaft can be provided for all reaction chambers.

The reaction chamber according to the invention in addition has a detachable sleeve, which is arranged in the opening of the floor. In the geometric aspect, the sleeve (and therefore also the opening of the floor of the reaction chamber) are arranged in alignment with the axis of rotation of the agitator shaft, in order that, in the case of the abovementioned reaction chambers stacked one above the other, a continuous agitator shaft can be obtained.

Furthermore, the internal diameter of the sleeve is greater than the diameter of the agitator shaft (of course, agitator elements mounted on the agitator shaft are not taken into account when the diameter is determined). Then, even when an agitator shaft is conducted through the opening and sleeve, a mass transfer can take place between chambers stacked one above the other. Preferably, the difference between the internal diameter of the sleeve and the diameter of the agitator shaft is >0 mm to ≤10 mm, more preferably ≥1 mm to ≤8 mm, and particularly preferably ≥2 mm to ≤7 mm. Owing to the fact that the sleeve is removable, for any reaction system, the mass transfer through the opening between sleeve and agitator shaft can be adapted individually.

As a result of the fact that the sleeve projects out of the reaction chamber, it ensures a decreased backmixing between the contents of the reaction chamber thereof and the contents of the subsequent reaction chamber into which it in turn projects. The extent to which the sleeve projects through the opening from the reaction chamber can be, for example ≥10% to ≤200%, more preferably ≥20% to ≤150%, and particularly preferably ≥30% to ≤100% of the internal diameter thereof, in each case measured from the lower side of the floor.

Further embodiments and aspects of the present invention are described hereinafter. They can be combined in any way with one another, provided that the contrary does not clearly result from the context.

In an embodiment of the reaction chamber according to the invention the agitator shaft is conducted out of the reaction chamber through the sleeve in such a manner that it projects out of the reaction chamber and a gap is formed between agitator shaft and sleeve.

Preferably, the gap between agitator shaft and sleeve has a width from >0 mm to ≤5 mm. The values are preferably from ≥0.5 mm to ≤4 mm and particularly preferably ≥1 mm to ≤3.5 mm.

In a further embodiment of the reaction chamber according to the invention, the floor has an inclination to the horizontal of >0° to ≤60°. Preferred inclinations are >5° to ≤50°, more preferably >10° to ≤45°. Such a tapering of the chamber floor serves to support a solid transport within the reaction chamber. In addition, the corners at which the floor abuts the casing, can be rounded.

In a further embodiment of the reaction chamber according to the invention the casing and the floor of the reaction chamber are constructed jointly as heating and/or cooling casing. This permits, for example, via a double-walled structure with a cavity, for a continuous-flow heating or cooling medium to be achieved. This embodiment generally has the advantage that a specific heat-transfer surface area which is as large as possible can be provided: the heating or cooling proceeds not only via the side walls, but also via the floors of the chamber. To maximize the outer heat-transfer coefficient, the inflow in the cavity can proceed tangentially, in such a manner that the entire flow of the heating or cooling medium is offset in rotation and a high relative velocity between wall and heating or cooling medium is achieved. The inflow velocity can be adapted by varying the diameter of the corresponding connections.

In a further embodiment of the reaction chamber according to the invention the agitator shaft is received within the reaction chamber by a bearing that is supported within the reaction chamber.

In a further embodiment of the reaction chamber according to the invention, the sleeve comprises a polymeric material. Suitable materials are, in particular, polytetrafluoroethylene (PTFE) and polyolefins such as polyethylene (PE) and polypropylene (PP).

Flat chambers offer advantages to achieve a high specific surface area and a high number of stages in a small structure. However, chambers that are too flat suppress the formation of vortexes and thus prevent effective mixing. In a further embodiment of the reaction chamber according to the invention, therefore, the chamber has a ratio of height to diameter of ≥0.4:1 to ≤1:1. The diameter in this case is taken to mean the internal diameter of the chamber and the internal height, measured from the lowest point within the chamber vertically up to the highest point within the chamber. Preferred ratios of chamber height to diameter are ≥0.5:1 to ≤0.9:1, and more preferably ≥0.6:1 to ≤0.8:1. The chamber internal diameter is, for example, between 2 and 15 cm.

In a further embodiment of the reaction chamber according to the invention, said reaction chamber in addition comprises additional feeds and/or outlets, through which substances can be introduced and/or discharged. Additional feeds and/or outlets can be desirable in order to add not all of the reaction components at the beginning of the reactor, but along the reactor. In this manner, for example undesirable side reactions or secondary reactions in a chemical reaction can be suppressed. Similarly, it can be desirable to separate off substances that are formed.

A further aspect of the present invention is a chemical reactor, wherein the reactor comprises a multiplicity of reaction chambers according to the present invention, wherein at least one first reaction chamber and one second reaction chamber are arranged following one another and the agitator shaft for the first reaction chamber is connected to the agitator shaft of the second reaction chamber to transmit a torque.

Preferably, 2 to 20 individual reaction chambers are used. It is further possible that a plurality of reaction chambers are connected to one another by additional feeds and/or outlets.

The invention further relates to a process for carrying out a chemical reaction, wherein the reaction is carried out in a reactor according to the present invention.

In an embodiment of the process according to the invention the reaction is carried out at least intermittently with a constant amount of substances introduced into the reactor and discharged from the reactor.

In a further embodiment of the process according to the invention, in the stirred reactor there are arranged, following one another, a first reaction chamber according to the invention comprising additional feeds and/or outlets through which substances can be introduced and/or discharged and a second reaction chamber according to the invention comprising additional feeds and/or outlets through which substances can be introduced and/or discharged. Furthermore, the agitator shaft of the first reaction chamber is connected to the agitator shaft of the second reaction chamber for transmitting a torque and in the first and/or second reaction chamber, at least one operating state is monitored, at a predetermined deviation of the operating state from a predetermined value of this operating state, the feeds opening out into this reaction chamber are closed and the substances originally transported through these feeds are introduced into another reaction chamber.

In this case, it is preferred that the monitored operating state is the pressure drop from one reaction chamber to the adjacent reaction chamber.

This reaction procedure permits a reaction chamber to be shut down in the event of blockages and other faults, and to pass the material streams in the reactor round this chamber. Thus, the reaction can be carried on at a following site.

In a further embodiment of the process according to the invention, the reaction is a multiphase reaction. This includes, for example, not only liquid/liquid systems, but also solid/liquid systems.

Figure 2:
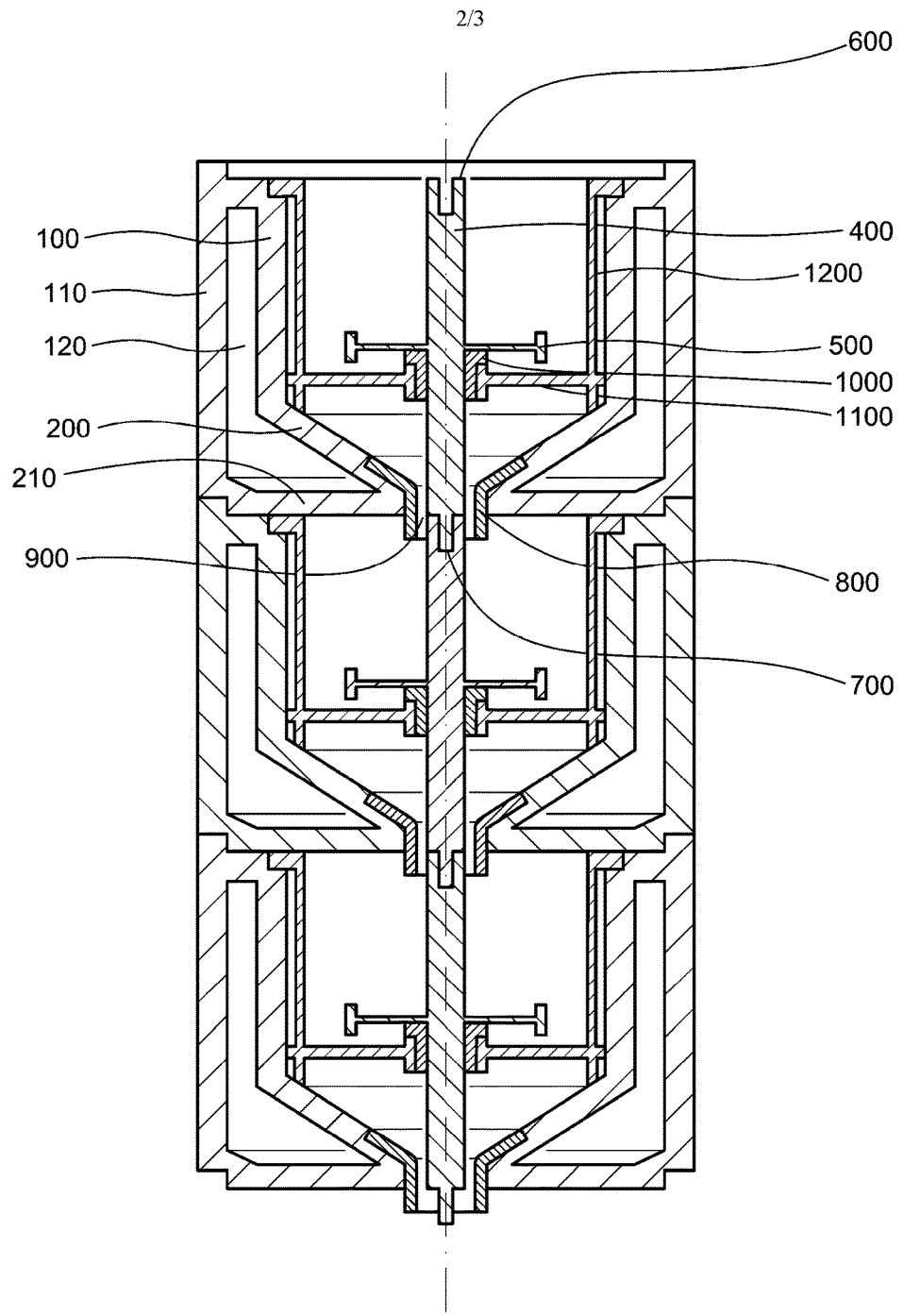
Figure 3:
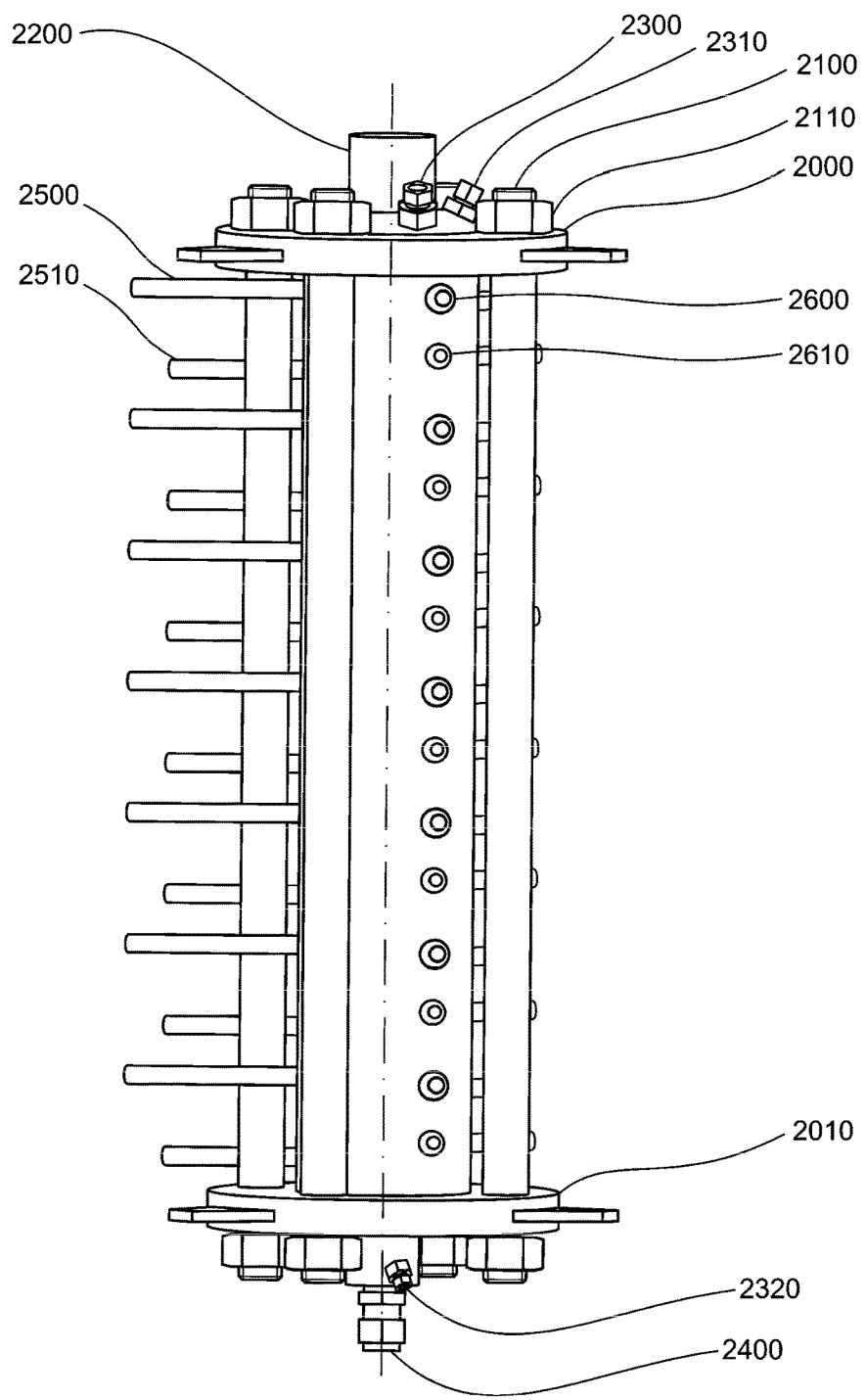

The present invention will be described in more detail with reference to the figures hereinafter, without being limited thereto. In the drawings:

FIG. 1 shows a reaction chamber according to the invention in a view from the top and in cross section FIG. 2 shows a multiplicity of reaction chambers according to the invention stacked one above the other in cross section FIG. 3 shows a chemical reactor according to the invention FIG. 1 shows a reaction chamber according to the invention in a combined view having a plan view (upper part of the figure) and a side cross sectional view (lower part of the figure). The reaction chamber has a casing 100, a floor 200 inclined in this case at 33°, and also an opening 300 in the floor 200. The casing 100 and the floor 200 are constructed jointly as heating and cooling casing. For this purpose, a double-shell construction having a second casing 110 and a second floor 210 is used, which contains a cavity 120. Through this cavity 120, a heating or cooling medium for heat exchange can be conducted by means of inlets and outlets that are not shown here. The chamber floor is also heated or cooled thereby and not only the casing as in many conventional structures of kettle reactors.

The reaction chamber in addition has an agitator shaft 400 for driving agitator elements 500. The beginning 600 of the agitator shaft 400 is shown at the top in FIG. 1, and the end 700 at the bottom. Beginning 600 and end 700 of the agitator shaft 400 are designed as female and male, respectively, connectors or plug-in connections, in such a manner that when a plurality of reaction chambers are stacked one above the other the agitator shafts of two successive reaction chambers engage in one another in a form-fitting manner in the direction of rotation. Then they form a combined agitator shaft with which the agitator elements of the individual chambers can be driven.

Within the reaction chamber, the agitator shaft 400 is received by a bearing 1000, which itself is supported via corresponding supports 1100 in the reaction chamber. In addition, within the reaction chamber, baffles 1200 are present which, in interaction with agitator elements 500, ensure a relatively high mixing of the reactor contents.

In the opening 300 of the floor 200 of the reaction chamber, in addition there is a removable sleeve 800 which (as shown at the bottom here) projects out of the reaction chamber. The sleeve 800 is arranged in alignment with the axis of rotation of the agitator shaft 600. In FIG. 1, sleeve and axis of rotation are centered in the reaction chamber.

The internal diameter of the sleeve 800 is greater than the diameter of the agitator shaft 400 at the height of the sleeve 800. In addition, the agitator shaft 400 projects through the sleeve 800 out of the reaction chamber. As a result, a gap 900 is formed between agitator shaft 400 and sleeve 800, through which gap, in the case of a plurality of reaction chambers stacked one above the other, a mass transfer can take place between one chamber and the adjacent chamber.

To increase the versatility and modularity of the use of the reaction chambers according to the invention, not only is the sleeve 800 detachable, but also the agitator shaft 400, the bearing 500, the support 1100 and the baffle 1200, and therefore are usable for other structures adapted to a specific application case.

FIG. 2 shows a cross-sectional view of three reaction chambers according to the invention stacked one above the other, as can occur in a chemical reactor according to the invention. The individual chambers are as shown and explained in FIG. 1. As may be seen, the reaction chambers are designed in such a manner that the bottom seal of one chamber forms the upper seal of the chamber lying therebeneath. As a result, a chemical reactor may be made up in a modular manner. Obviously, a sealing composition can also further be provided between the individual reaction chambers.

The agitator shafts 400 engaging in one another in a form-fitting manner in the direction of rotation form, as related to transmission of a torque, a combined agitator shaft. In this case, it can be noted that shear forces also occur in the gap 900, which is formed between agitator shaft 400 and sleeve 800 and through which a mass transfer can take place between adjacent reaction chambers. Therefore, there is no "dead zone" in which the contents of the reaction chamber are not thoroughly agitated.

The width of the gap 900 and therefore the mass transfer between the individual reaction chambers may be established by means of the diameter of the agitator shaft and/or the internal diameter of the sleeves 800. For practical reasons, it is preferred only to exchange the sleeves 800 if another gap width between the chambers is desired. Owing to the fact that the sleeves 800 are removable, this is effected in a simple manner.

FIG. 3 shows schematically a chemical reactor according to the invention with a total of seven reaction chambers according to the invention. The reaction chambers are stacked one above the other in a similar manner to the arrangement shown in FIG. 2 and are sealed at top and bottom with a cover plate 2000 and base plate 2010. The arrangement is mechanically stabilized by means of tie rods 2100 and nuts 2110.

A torque for driving the agitator shafts is transmitted by means of coupling 2200 to the agitator shafts in the interior of the chemical reactor. In the cover plate 2000, in addition accesses 2300 and 2310 are arranged, through which substances or measuring sensors can be introduced into the topmost reaction chamber. Such an access 2320 is also located at the outlet 2400 which is integrated into the base plate 2010.

Via the feed lines 2500 and the outlets 2510, the heating/cooling casings of the individual reaction chambers can be provided with a heating or cooling medium. An individual heating or cooling is possible.

The individual reaction chambers are accessible via accesses 2600 and 2610 for material introduction, material discharge and measuring sensors. Via a suitably chosen piping installation, in addition, a bridging of a reaction chamber can be achieved, if a fault occurs during running operation.

The invention claimed is:

1. A reaction chamber for a chemical reactor, comprising:
   a first casing of the reaction chamber,
   a first floor of the reaction chamber connected to the first casing and having an opening located in the floor,
   an agitator shaft located in the chamber and having at least one agitator element connected thereto, wherein the agitator shaft, seen in the longitudinal direction, has a beginning and an end,
   a removable sleeve having a first open end and an opposing second open end, wherein the second opposing open end projects out of the opening in the first floor of the reaction chamber,
   wherein the removable sleeve is arranged in alignment with the axis of rotation of the agitator shaft,
   wherein the internal diameter of the removable sleeve is greater than the diameter of the agitator shaft,
   wherein the agitator shaft extends through the first open end and the opposing second open end of the removable sleeve out of the reaction chamber and forming a gap between the agitator shaft and the inner wall of the removable sleeve, and,
   wherein each of the beginning and end of the agitator shaft is adapted to attach to an end or a beginning of a second agitator shaft, respectively.

2. The reaction chamber as claimed in claim 1, wherein the first floor has an inclination to the horizontal of >0° to ≤60°.

3. The reaction chamber as claimed in claim 1, further comprising a second floor and a second casing wherein the first casing, the first floor, the second casing and the second floor of the reaction chamber are together configured as a double wall enclosing a cavity wherein constructed the cavity contains a heating and/or cooling fluid.

4. The reaction chamber as claimed in claim 1, wherein the agitator shaft is received within the reaction chamber by a bearing that is supported within the reaction chamber.

5. The reaction chamber as claimed in claim 1, wherein the sleeve comprises a polymeric material.

6. The reaction chamber as claimed in claim 1, wherein the chamber has a ratio of height to diameter of $\geq 0.4:1$ to $\leq 1:1$.

7. The reaction chamber as claimed in claim 1, wherein the gap between agitator shaft and sleeve has a width from >0 mm to $\leq 5$ mm.

8. The reaction chamber as claimed in claim 1, further comprising additional feeds and/or outlets, through which substances can be introduced and/or discharged respectively.

9. A chemical reactor, wherein the reactor comprises a plurality of reaction chambers as claimed in claim 1, wherein at least one first reaction chamber and at least one second reaction chamber are arranged one above the other;
   wherein the second opposing end of the removable sleeve of each a least one first reaction chamber positioned above a lower reaction chamber extends into the second reaction chamber directly below the at least one first reaction chamber;
   wherein the end of the agitator shaft of each at least one first reaction chamber is attached to the beginning of the agitator shaft of the at least one second reaction chamber directly below it; and,
   wherein the attached agitator shaft of each of the at least one first reaction chamber absorbs reversibly a torque provided by means of the agitator shaft of the at least one second reaction chamber and/or transmits a torque to a shaft attached to another at least one second reaction chamber.

10. The chemical reactor of claim 9 wherein at least one of the plurality of chemical reactors further comprises a second casing and a second floor wherein the first casing, the first floor, the second casing, and the second floor of the at least one reaction chamber are together configured as a double wall enclosing a cavity wherein the cavity contains a heating and/or cooling fluid.

11. A reaction chamber for a chemical reactor, comprising:
   a first casing of the reaction chamber,
   a first floor of the reaction chamber connected to the casing and having an opening located in the floor,
   an agitator shaft located in the chamber and having at least one agitator element connected thereto, wherein the agitator shaft, seen in the longitudinal direction, has a beginning and an end,
   a removable sleeve having a first opening and an opposing second opening,
   wherein the second opposing opening projects out of the opening in the first floor of the reaction chamber,
   wherein the removable sleeve is arranged in alignment with the axis of rotation of the agitator shaft,
   wherein the internal diameter of the removable sleeve is greater than the diameter of the agitator shaft,
   wherein the agitator shaft extends through the first opening and the opposing second opening of the removable sleeve out of the reaction chamber through the sleeve and forming a gap between the agitator shaft and the removable sleeve, and,
   wherein each of the beginning and end of the agitator shaft is adapted to reversibly attach to a beginning or an end of a second agitator shaft; and,
   wherein the first floor has an inclination to the horizontal of >0° to $\leq 60°$.

12. The reaction chamber as claimed in claim 11, further comprising a second floor and a second casing, wherein the first casing, the first floor, the second casing, and the second floor of the reaction chamber are together configured as a double wall enclosing a cavity wherein the cavity contains a heating and/or cooling fluid.

13. The reaction chamber as claimed in claim 11, wherein the agitator shaft is received within the reaction chamber by a bearing that is supported within the reaction chamber.

14. The reaction chamber as claimed in claim 11, wherein the chamber has a ratio of height to diameter of $\geq 0.4:1$ to $\leq 1:1$.

15. The reaction chamber as claimed in claim 11, wherein the gap between agitator shaft and sleeve has a width from >0 mm to $\leq 5$ mm.

16. The reaction chamber as claimed in claim 11, further comprising additional feeds and/or outlets, through which substances can be introduced and/or discharged, respectively.

17. A chemical reactor, wherein the reactor comprises a plurality of reaction chambers as claimed in claim 11, wherein at least one first reaction chamber and at least one second reaction chamber are arranged one above the other;
   wherein the second opposing end of the removable sleeve of each at least one first reaction chamber extends into one second reaction chamber;
   wherein the end of the agitator shaft of each at least one first reaction chamber is attached to the beginning of the agitator shaft of the second reaction chamber directly below it; and,
   wherein the attached agitator shaft of each of the at least one first reaction chamber absorbs reversibly a torque provided by means of the agitator shaft of the at least one second reaction chamber and/or transmits a torque to a shaft attached to another at least one second reaction chamber.

18. The chemical reactor of claim 17 wherein at least one of the plurality of reaction chambers further comprises a second floor and a second casing wherein the first casing, the first floor, the second casing, and the second floor of the at least one reaction chamber are together configured as a double wall enclosing a cavity wherein the cavity contains a heating and/or cooling fluid.

19. The chemical reactor of claim 17 wherein at least one of the plurality of chemical reactors further comprises additional feeds and/or outlets, through which substances can be introduced and/or discharged, respectively.

* * * * *